April 12, 1960 J. A. HERRMANN 2,932,686

CLAMPING MEANS FOR JOINING BUS DUCT UNITS

Filed Dec. 24, 1956 2 Sheets-Sheet 1

INVENTOR.
JOHN A. HERRMANN
BY Ostrolenk, Faber, Gerb & Soffen
ATTORNEYS

CLAMPING MEANS FOR JOINING BUS DUCT UNITS

Filed Dec. 24, 1956 2 Sheets-Sheet 2

INVENTOR.
JOHN A. HERRMANN
BY Ostrolenk, Faber, Gerb & Soffen
ATTORNEYS

United States Patent Office 2,932,686

Patented Apr. 12, 1960

2,932,686

CLAMPING MEANS FOR JOINING BUS DUCT UNITS

John A. Herrmann, Grosse Pointe Farms, Mich., assignor, by mesne assignments, to I-T-E Circuit Breaker Company, Philadelphia, Pa., a corporation of Pennsylvania Application December 24, 1956, Serial No. 630,154

8 Claims. (Cl. 174—88)

My invention relates to a clamping means for connecting bus duct units which may be of low reactance type, and more specifically to a clamping means for electrically connecting buses of the same phase within an individual bus duct unit so as to assure equal current distribution therebetween as well as joining associated bus bars of bus duct units forming a complete bus duct system.

This invention is based on co-pending application Serial No. 658,773, filed May 13, 1957 entitled, "Bus Bar Joining Means for Low Impedance Bus Duct" to George Farnsworth and assigned to the assignee of the instant invention which shows bus duct units constructed in accordance with the low reactance principle as set forth in United States Patent No. 2,287,502 to A. A. Togesen, et al. In this patent to Togesen et al., a pair of conductors are provided for each phase and each bus or conductor is then placed in a closely spaced relationship to a bus which, because of the geometrical bus arrangement, will carry a current which is 180° displaced in phase from the current in the first bus current.

Thus, when bus duct units are designed to have a ladder type arrangement wherein one bus is positioned on top of another, it is desirable that the individual bus units be so adapted as to provide easy connection to the next unit and it is similarly desirable that the pair of conductors corresponding to a particular phase be interconnected between each bus duct unit so as to ensure an equal current distribution between the conductors of this pair, as has been shown in the aforesaid copending application Serial No. 658,773 filed May 13, 1957.

In the above-identified references, the bus bar portions at the end of a bus duct unit have had connecting means inserted therein so as to allow connection to the next unit. This connecting means required that a portion of each bus cross-sectional area be cut away so as to allow the bus to accept a connecting means such as a bolt. However, in so cutting away a portion of the cross-sectional area of the bus, it is understood that the current density at this portion will be relatively high and may cause undesirable local heating.

Furthermore, the ends of the bus duct unit housings have to be provided with removable covers in order to allow access to the buses within the housing for connecting purposes. Hence, the disadvantages of having high current density points along the bus bar connecting portions and the required machining of the bus bars for allowing bolt connections as well as the provision of removable hand hole covers in the bus duct unit for allowing access to the bus not only results in relatively undesirable operation of the bus in view of the local heating, but they also require relatively complex manufacturing procedures.

My invention contemplates the provision of clamping means connected to each end of individual bus duct units which is so adapted as to position and electrically connect buses of the same phase within an individual bus duct unit and simultaneously interconnect associated bus bars of adjacent bus duct units.

Thus the clamping means of a first bus duct unit will cooperate with the clamping means of an adjacent bus duct unit so that each pair of conductors for each phase within the adjacent bus duct units will be electrically connected and clamped into position.

This clamping means may be so constructed as to be operable from an external position with respect to the bus duct housing so that direct access to the bus bars through hand hole openings need not be provided. Furthermore, since a clamping means is utilized, the ends of the bus bars of the individual bus duct units need not be drilled to allow bolt type connections to be passed therethrough so that the current density at the point of connection of associated bus bars will be at the same value as the other portions of the bus bar.

Accordingly, a primary object of my invention is to automatically interconnect associated bus bars of a first and second bus duct unit when the two bus duct units are connected together.

Another object of my invention is to provide a clamping means to be carried at each end of a bus duct unit so that it will cooperate with the clamping means of an adjacent bus duct unit so as to interconnect bus bars of the same phase within each individual bus duct unit as well as interconnect associated bus bars of each of the bus duct units.

Still aother object of my invention is to connect the bus bars of a first and second bus duct unit together with a connecting means which is operable from external portions of the bus duct housing.

These and other objects of my invention will become apparent from the following description when taken in conjunction with the drawings, in which.

Figures 1, 2, 4:
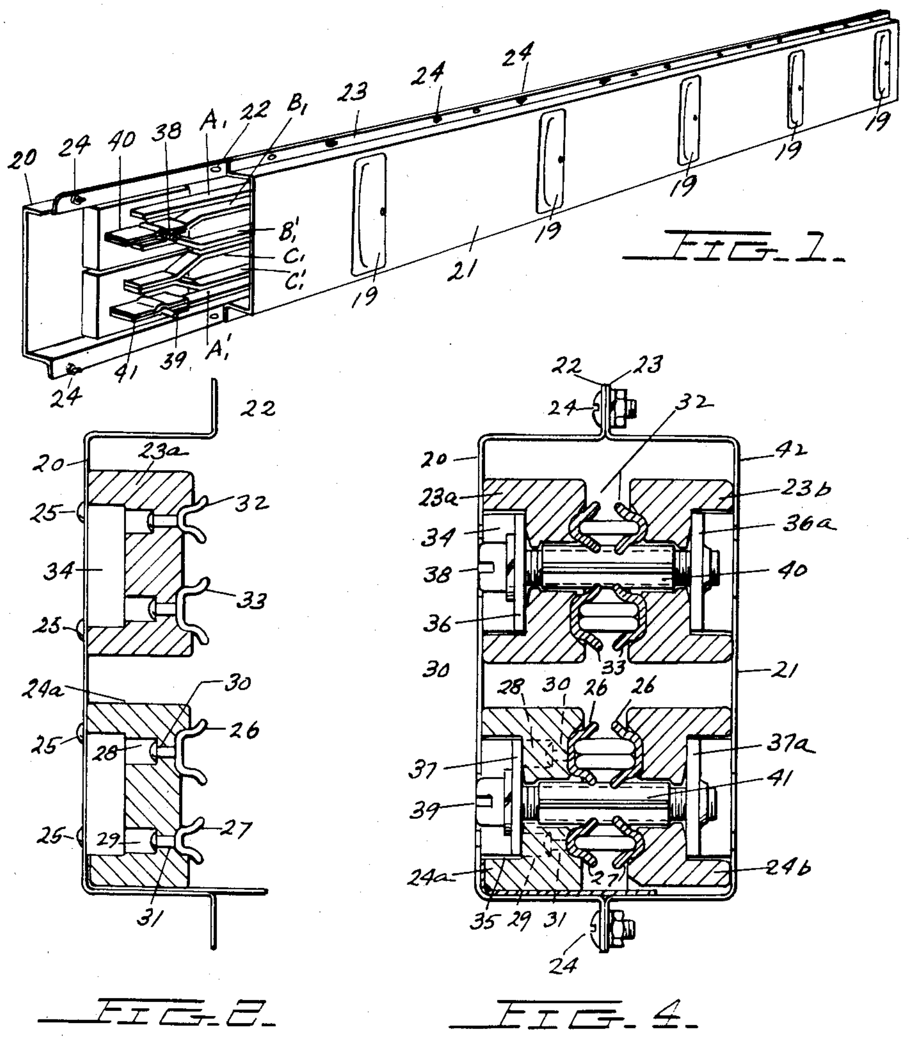
Figure 1 shows a perspective view of a ladder type bus arrangement which may be connected to a similar type bus duct unit by the connecting means of my novel invention.
Figure 2 shows the end of a bus duct unit housing when adapted with one of the clamping means of my novel invention.
Figure 4 shows a cross-sectional view through the clamping means of Figure 3 across lines 4—4.

Referring now to Figure 1, it is seen that a single bus duct unit is comprised of a network of six bus bars, $A_1$, $A_1'$, $B_1$, $B_1'$, $C_1$ and $C_1'$, wherein bus bars $A_1$ and $A_1'$, $B_1$ and $B_1'$, and $C_1$ and $C_1'$ are energized from a first, second and third phase respectively. However, in accordance with United States Patent No. 2,287,502 described above, bars $A_1'$ and $C_1$, $C_1'$ and $B_1$ and $B_1'$ and $A_1$ are constructed so as to be in a close spaced relationship with one another so as to offer a very low reactance system.

The above noted bus bars of Figure 1 may be supported in any desired manner from the bus duct housing which is comprised of duct halves 20 and 21. These halves are seen to have flanged ends 22 and 23 respectively, which flanges allow a connection between the two duct halves 20 and 21 by means of the bolt arrangement such as the bolts 24 which interconnect the flanges 22 and 23. It is further seen that the duct halves 20 and 21 are so positioned with respect to one another as to provide a scarf lap joint upon connection to another bus duct unit which is constructed in an identical manner. Hence, by placing the scarf lap joint of the second bus duct unit so as to be connected by bolts, such as bolts 24, a high strength joint will be achieved.

Electrical connections or tap-offs may then be had through holes in the bus duct, which are normally covered by covers such as covers 19, in bus duct half 21, to the buses contained within the bus duct housing.

Figure 2 shows a side view of the end of bus duct housing section 20 when adapted with a clamping means which is positioned adjacent to the end of the individual buses to be housed. Bases 23*a* and 24*a* are seen to be connected to the duct section 20 in any desired manner, such as the screw means 25.

Referring now to base 24*a*, which is constructed in an identical manner as the base 23*a*, it is seen that two U-shaped conducting members 26 and 27 are connected thereto. Conducting members 26 and 27 may be connected to the base 24*a* as shown in Figures 2 and 4 by providing apertures 28 and 29 in the base 24*a* and to then provide a rivet means 30 and 31 respectively for cooperating with the jumpers 26 and 27 respectively. The openings 28 and 29 may then be filled with a sealing wax for electrical insulation.

The base 23*a* has the copper jumpers 32 and 33 connected thereto in the same manner as has been described in connection with the jumper members of the base 24*a*.

The bases 23*a* and 24*a* are further constructed to contain recesses 34 and 35 respectively for accommodating steel channel shaped bearing members 36 and 37 respectively. Channel shaped members 36 and 37 have through holes therein for receiving bolts 38 and 39 respectively, which as will be seen hereinafter are used to clamp adjacent bus housings together.

Laminated fiber insulators 40 and 41 associated with bases 23*a* and 24*a* respectively have one end supported in recesses in bases 23*a* and 24*a* respectively, and are formed by pressing and cementing two individual insulating sheets together with a tight fit opening in the center which receives and supports bolts 38 and 39 respectively. Furthermore, the insulators 40 and 41 serve to insulate adjacent bus bars of opposite phases from one another.

Figure 3:
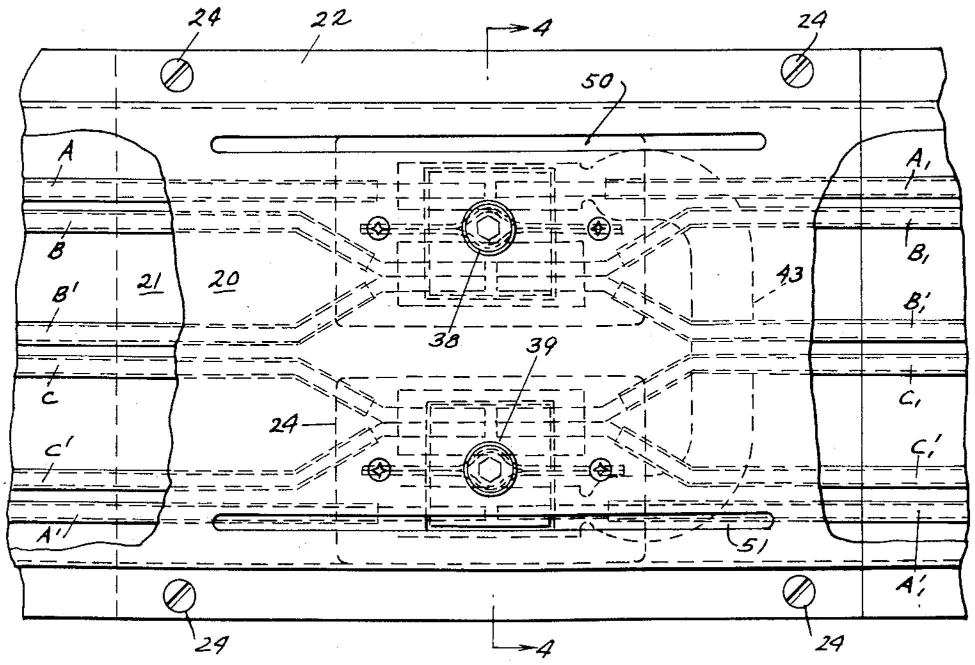
Figure 3 shows a side view of the ends of two bus duct units of the type show in Figure 1 when adapted with the connecting means of my novel invention.
Figure 5:
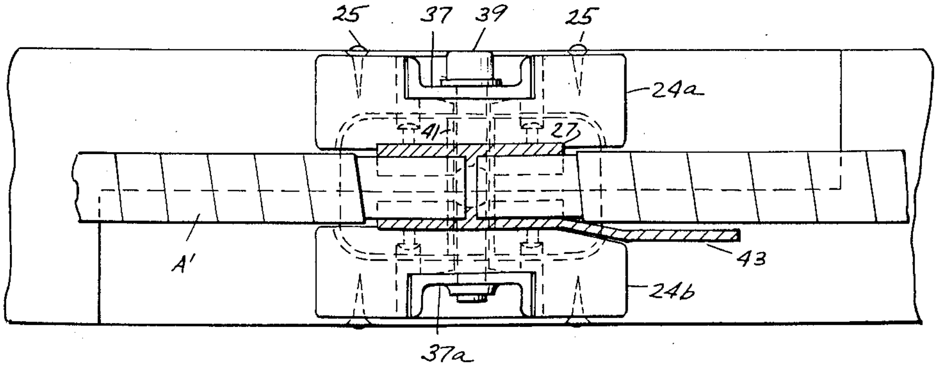
Figure 5 shows a top view of Figure 3.

Figures 3, 4 and 5 show the interconnection between two bus duct units which have their ends adapted as is shown in Figure 2 and illustrate the operation of my novel invention.

Referring first to Figure 3, it is seen that the bus duct unit of Figure 1 which carrier buses $A_1$, $B_1$, $B_1'$, $C_1$, $C_1'$, and $A_1'$ is to be connected with a second bus duct unit of the type of Figure 1 carrying buses A, B, B′, C, C′ and A′. Here it is to be understood that each of the buses marked A, A′, $A_1$ and $A_1'$ correspond to a first phase, while buses marked B, B′, $B_1$ and $B_1'$ correspond to a second phase, and buses marked C, C′, $C_1$ and $C_1'$ correspond to still another phase in a multiphase system.

It is necessary that each of the buses of one phase be interconnected in accordance with this novel invention so as to assist in an equal current distribution between the buses of the pair of buses corresponding to one phase and to provide continuity between the bus duct units of a bus duct system.

As seen more specifically in Figures 3 and 4, the bus duct units to be connected have their ends constructed in accordance with the construction of Figure 2, and it is seen that the bus duct unit carrying the buses A, B, C, A′, B′ and C′ and having a housing 42 carries bases 23*b* and 24*b*. Bases 23*b* and 24*b* are identical to those of the bus duct housing 22 (bases 23*a* and 24*a*) with the exception that the channels 36*a* and 37*a* are provided with a tapped opening for cooperating with bolts 38 and 39 of duct half 22.

As best seen in Figure 4, in connecting the two bus duct units they are first brought into position with respect to one another whereupon the jumpers or clamps 26 clamp the bus bars C, C′, $C_1$ and $C_1'$ in electrical and mechanical engagement while jumpers 33 clamp buses B, B′, $B_1$ and $B_1'$ in electrical and mechanical engagement. The jumpers 27 and 32 are electrically connected by the jumper means 43 (Figure 3) which is insulated by an insulating tape so as to prevent short circuiting, mechanically position and electrically interconnect buses A, A′, $A_1$ and $A_1'$ as seen in Figure 4. It is to be noted that the bus bars C, C′, $C_1$, $C_1'$, A, A′, etc. are in end to end relationship, rather than overlapping at the joint.

At the same time, the insulators 40 and 41 are seated in cooperating recesses in bases 23*b* and 24*b* so that the insulators are now rigidly secured between bases 23*a*, 23*b* and 24*a*, 24*b* respectively. The two duct sections may be connected at their scarf lap joints by the bolts 24 and the clamping connection may then be tightened by the bolts 38 and 39 which are operable externally of the bus duct housing.

As seen in Figure 3, the duct cover portion adjacent the support bases may have the slots 50 and 51 therein for providing a spring type action when the bolts 38 and 39 are tightened to assure ample clamping pressure between the various clamps and their associated bases.

If desired, the jumpers 26, 27, 32 and 33 may be flared out along their longitudinal edges as is seen in Figure 4 so as to guide the bus bars of adjacent sections into position during installation thereof, but any desired configuration could be used.

Although I have here described preferred embodiments of my novel invention, many variations and modifications will now be apparent to those skilled in the art. I prefer thereofore to be limited not by the specific disclosure herein but only by the appended claims.

I claim:

1. A multiphase electrical distribution system comprised of a plurality of bus duct units, each of said plurality of bus duct units being comprised of a pair of conductors for each phase arranged to provide low reactance for said electrical distribution system, and a housing for each of said units, the ends of said bus duct unit housings adjacent to one another having a clamping means associated therewith, said clamping means being constructed to electrically connect all conductors of adjacent bus units associated with a common phase when said adjacent bus duct units are connected together, said clamping means being further constructed to position all conductors of said units in end to end relationship with corresponding conductors of adjacent units.

2. A multiphase electrical distribution system comprised of a plurality of bus duct units, each of said plurality of bus duct units being comprised of a pair of conductors for each phase arranged to provide low reactance for said electrical distribution system, and a housing for each of said units, the ends of said bus duct unit housings adjacent to one another having a clamping means associated therewith, said clamping means being constructed to electrically connect all conductors of adjacent bus units associated with a common phase and to mechanically connect said adjacent bus duct units to one another, said clamping means being further constructed to position all conductors of said units in end to end relationship with corresponding conductors of adjacent units.

3. A multiphase electrical distribution system comprised of a plurality of bus duct units, each of said plurality of bus duct units being comprised of a pair of conductors for each phase arranged to provide low reactance for said electrical distribution system, and a housing for each of said units, the ends of said bus duct unit housings adjacent to one another having a clamping means associated therewith, said clamping means being constructed to electrically connect all conductors of adjacent bus units associated with a common phase when said adjacent bus duct units are connected together, said clamping means being operable from external portions of said bus duct housings, said clamping means being further constructed to position all conductors of said units in end to end relationship with corresponding conductors of adjacent units.

4. A multiphase electrical distribution system comprised of a plurality of bus duct units, each of said plurality of bus duct units being comprised of a pair of conductors for each phase arranged to provide low reactance for said electrical distribution system, and a housing for each of said units, the ends of said bus duct unit housings adjacent to one another having a clamping means associated therewith, said clamping means being constructed to electrically connect all conductors of adjacent bus duct units associated with a common phase and to mechanically connect said adjacent bus duct units to one another, said clamping means being operable from external portions of said bus duct housings, said clamping means being further constructed to position all conductors of said units in end to end relationship with corresponding conductors of adjacent units.

5. In a first and second bus duct unit, each comprising a pair of conductors and a housing therefor, a unitary clamping means; said clamping means comprising a pair of cooperating members connected to said first and second bus duct housing; said unitary clamping means being constructed to mechanically clamp and electrically connect each of said pair of conductors of said first and second bus duct unit; said unitary clamping means being further constructed to mechanically connect said first and second bus duct units to one another; said unitary clamping means being secured to said housing at a first region thereof, said first region including cut out formations whereby said housing is provided with a spring type action to assure good electrical connections even though housing of adjacent bus duct units are misaligned.

6. In a first and second bus duct unit, each comprising a pair of conductors and a housing therefor, a unitary clamping means for mechanically clamping and electrically connecting each of said pair of conductors of said first and second bus duct unit; said unitary clamping means being further constructed to mechanically connect said first and second bus duct units to one another; said unitary clamping means being operable from external portions of said bus duct housings; said unitary clamping means being sucured to said housing at a first region thereof, said first region including cut out formations whereby said housing is provided with a spring type action to assure good electrical connections even though housing of adjacent bus duct units are misaligned.

7. In a first and second bus duct unit, each comprising a pair of conductors and a housing therefor, a clamping means; said clamping means including a first conducting clamp member supported from said first bus duct housing at a first region thereof and a second clamp member supported from said second bus duct housing at a first region thereof; said first and second clamp members being positioned to clamp and electrically connect each of said pairs of conductors together when said first and second bus duct units are connected to one another; each of said first regions including slotted formations whereby said duct housings are provided with a spring type action to assure good electrical connections even though said bus duct unit housings are misaligned.

8. In a first and second bus duct unit, each comprising a pair of conductors and a housing therefor, a clamping means; said clamping means including a first conducting clamp member supported from said first bus duct housing at a first region thereof and a second clamp member supported from said second bus duct housing at a first region thereof; said first and second clamp members being positioned to clamp and electrically connect each of said pairs of conductors together when said first and second bus duct units are connected to one another; said clamping means being further constructed to mechanically connect said first and second bus duct units to one another; each of said first regions including slotted formations whereby said duct housings are provided with a spring type action to assure good electrical connections even though said bus duct unit housings are misaligned.

References Cited in the file of this patent

UNITED STATES PATENTS

| | | |
|---|---|---|
| 2,009,376 | Frank | July 23, 1935 |
| 2,059,988 | Frank | Nov. 3, 1936 |
| 2,287,502 | Togesen et al. | June 23, 1942 |
| 2,350,601 | Frank et al. | June 6, 1944 |

FOREIGN PATENTS

| | | |
|---|---|---|
| 562,485 | France | Sept. 6, 1923 |